US011673595B2

(12) United States Patent
Kwok et al.

(10) Patent No.: US 11,673,595 B2
(45) Date of Patent: Jun. 13, 2023

(54) STROLLER

(71) Applicant: Britax Childcare Hong Kong Ltd, Kowloon Bay (HK)

(72) Inventors: Jackson Kwok, Kowloon Bay (HK); Bill Yang, Kowloon Bay (HK)

(73) Assignee: BRITAX CHILDCARE HONG KONG LTD, Kowloon Bay (HK)

( * ) Notice: Subject to any disclaimer, the term of this patent is extended or adjusted under 35 U.S.C. 154(b) by 0 days.

(21) Appl. No.: 17/668,982

(22) Filed: Feb. 10, 2022

(65) Prior Publication Data

US 2022/0234638 A1 Jul. 28, 2022

Related U.S. Application Data

(63) Continuation of application No. 16/842,328, filed on Apr. 7, 2020, now Pat. No. 11,247,711.

(51) Int. Cl.
*B62B 7/06* (2006.01)
*B62B 9/20* (2006.01)
(Continued)

(52) U.S. Cl.
CPC ............. *B62B 7/062* (2013.01); *B62B 7/064* (2013.01); *B62B 7/08* (2013.01); *B62B 7/10* (2013.01);
(Continued)

(58) Field of Classification Search
CPC .......... B62B 7/062; B62B 7/064; B62B 7/08; B62B 7/10; B62B 9/203; B62B 2205/003
See application file for complete search history.

(56) References Cited

U.S. PATENT DOCUMENTS

| 3,797,848 A | 3/1974 | Burnham |
| 8,485,547 B2 | 7/2013 | Hsu |

(Continued)

FOREIGN PATENT DOCUMENTS

DE 102016103184 A1 8/2017

*Primary Examiner* — John D Walters
(74) *Attorney, Agent, or Firm* — K&L Gates LLP

(57) ABSTRACT

A collapsible stroller comprising a handle assembly, a front leg assembly and a rear leg assembly pivotably connected to one another such that the stroller is able to be moved between a folded configuration, where the front leg and handle assemblies are folded to positions substantially adjacent to the rear leg assembly, and an unfolded configuration, where the front leg and handle assemblies are unfolded to positions away from the rear leg assembly, and a link assembly comprising a front member and a rear member pivotally connected to one another, wherein the front member is pivotally connected to an intermediate portion of the front leg assembly and the rear member is pivotally connected to an intermediate portion of the rear leg assembly, such that when the stroller is moved to its folded configuration the front and rear members are folded toward each other to lie substantially adjacent to one another and the front and rear leg assemblies, and when the stroller is moved to its unfolded configuration the front and rear members are folded away from each other and the front and rear leg assemblies such that they are substantially coplanar with one another, and wherein the link assembly further comprises a biasing means for biasing the front and rear link members toward their unfolded positions.

19 Claims, 14 Drawing Sheets

(51) Int. Cl.
*B62B 7/08* (2006.01)
*B62B 7/10* (2006.01)

(52) U.S. Cl.
CPC ........ *B62B 9/203* (2013.01); *B62B 2205/003* (2013.01)

(56) References Cited

U.S. PATENT DOCUMENTS

| | | | |
|---|---|---|---|
| 8,919,806 B2* | 12/2014 | Pollack | B62B 7/08 280/647 |
| 8,991,854 B2* | 3/2015 | Greger | B62B 3/022 280/650 |
| 9,308,929 B1 | 4/2016 | Dowd et al. | |
| 9,346,479 B1* | 5/2016 | Ransil | B62B 7/064 |
| 9,540,028 B2 | 1/2017 | Taylor et al. | |
| 9,561,816 B2* | 2/2017 | Dowd | B62B 7/08 |
| 9,908,551 B2 | 3/2018 | Ransil | |
| 10,023,217 B2* | 7/2018 | Sack | B62B 7/10 |
| 10,836,419 B2* | 11/2020 | Oakes | B62B 7/145 |
| 2012/0187660 A1 | 6/2012 | Liao | |
| 2013/0147162 A1 | 6/2013 | Hsu | |
| 2016/0046314 A1 | 2/2016 | Zehfuss et al. | |

* cited by examiner

STROLLER

PRIORITY CLAIM

The present application is a continuation of U.S. patent application Ser. No. 16/842,328, filed Apr. 7, 2020, the entire contents of which are incorporated herein by reference and relied upon.

TECHNICAL FIELD

The present invention relates to a stroller.

BACKGROUND

In general, strollers are wheeled devices used to transport a passenger, typically a child. Strollers are generally configured to fold or collapse when not in use in order to occupy less space. Mechanisms that enable strollers to fold or collapse often create significant pinch points where a user of the seat can be pinched during the folding and unfolding of the stroller. Such mechanisms can also be quite complex, resulting in a stroller that may be difficult or awkward to fold and unfold, and resulting in a stroller having a significant weight which can be difficult to handle when folded.

It is against this background that the present disclosure has been developed.

SUMMARY

According to a first aspect, there is provided a collapsible stroller comprising a handle assembly, a front leg assembly and a rear leg assembly pivotably connected to one another such that the stroller is able to be moved between a folded configuration, where the front leg and handle assemblies are folded to positions substantially adjacent to the rear leg assembly, and an unfolded configuration, where the front leg and handle assemblies are unfolded to positions away from the rear leg assembly and a link assembly comprising a front member and a rear member pivotally connected to one another, wherein the front member is pivotally connected to an intermediate portion of the front leg assembly and the rear member is pivotally connected to an intermediate portion of the rear leg assembly, such that when the stroller is moved to its folded configuration the front and rear members are folded toward each other to lie substantially adjacent to one another and the front and rear leg assemblies, and when the stroller is moved to its unfolded configuration the front and rear members are folded away from each other and the front and rear leg assemblies such that they are substantially coplanar with one another, and wherein the link assembly further comprises a biasing means for biasing the front and rear link members toward their unfolded positions.

In one form, the biasing means is in the form of at least one torsion spring.

In one form, the at least one torsion spring is located at a pivotal connection between the rear leg assembly and the rear link member, such that it biases the rear link member away from the rear leg assembly.

In one form, the at least one torsion spring is located at a pivotal connection between the front leg assembly and the front link member, such that it biases the front link member away from the front leg assembly.

In one form, the at least one torsion spring is located at a pivotal connection between the front link member and the rear link member, such that it biases the front link member and the rear link member away from each other toward their respective unfolded positions.

In one form, the stroller further comprises a locking means for locking the handle and link assemblies in their unfolded positions, and a release means for releasing the handle and link assemblies from their respective unfolded positions.

In one form, the release means comprises a strap located on the link assembly, wherein lifting of the strap releases the handle and link assemblies.

In one form, release of the handle assembly causes the handle to collapse due to self-weight against the rear leg assembly.

In one form, further lifting of the centre-pull strap causes the front and rear link members to fold toward one another and the front leg assembly to fold toward the rear leg assembly.

The collapsible stroller of any one of the preceding claims, further comprising a latching means for locking the handle and front leg assembly in their folded positions substantially adjacent the rear leg assembly, and a release means for releasing the handle and front leg assemblies from their respective folded positions.

In one form, wherein upon release of the front leg assembly, the biasing means causes the link assembly and the front leg assembly to move to their unfolded positions.

In one form, the front leg assembly comprises a forward end portion configured to support at least one front wheel, and a rearward end portion comprising two legs which extend away from the forward end portion along either side of the stroller.

In one form, the rear leg assembly comprises a lower end portion configured to support at least one rear wheel, and an upper portion comprising two legs which extend away from the lower end portion along either side of the stroller.

In one form, the handle assembly comprises a handle portion and two side arms extending away from the handle portion along either side of the stroller.

According to a second aspect, there is provided a collapsible stroller comprising a handle assembly, a front leg assembly and a rear leg assembly pivotably connected to one another such that the stroller is able to be moved between a folded configuration, where the front leg and handle assemblies are folded to positions substantially adjacent to the rear leg assembly, and an unfolded configuration, where the front leg and handle assemblies are unfolded to positions away from the rear leg assembly, and a seat assembly comprising a front seat member and a rear seat member pivotally connected to one another, wherein the front seat member is pivotally connected to an intermediate portion of the front leg assembly and the rear seat member is pivotally connected to an intermediate portion of the rear leg assembly, such that when the stroller is moved to its folded configuration the front and rear members are folded toward each other to lie substantially adjacent to one another and the front and rear leg assemblies, and when the stroller is moved to its unfolded configuration the front and rear members are folded away from each other and the front and rear leg assemblies such that they are substantially coplanar with one another, providing a support surface for a passenger of the stroller to sit on, wherein the link assembly further comprises a biasing means for biasing the front and rear seat members toward their unfolded positions.

BRIEF DESCRIPTION OF DRAWINGS

Embodiments of the present invention will be discussed with reference to the accompanying drawings wherein.

DESCRIPTION OF EMBODIMENTS

Figure 1A:
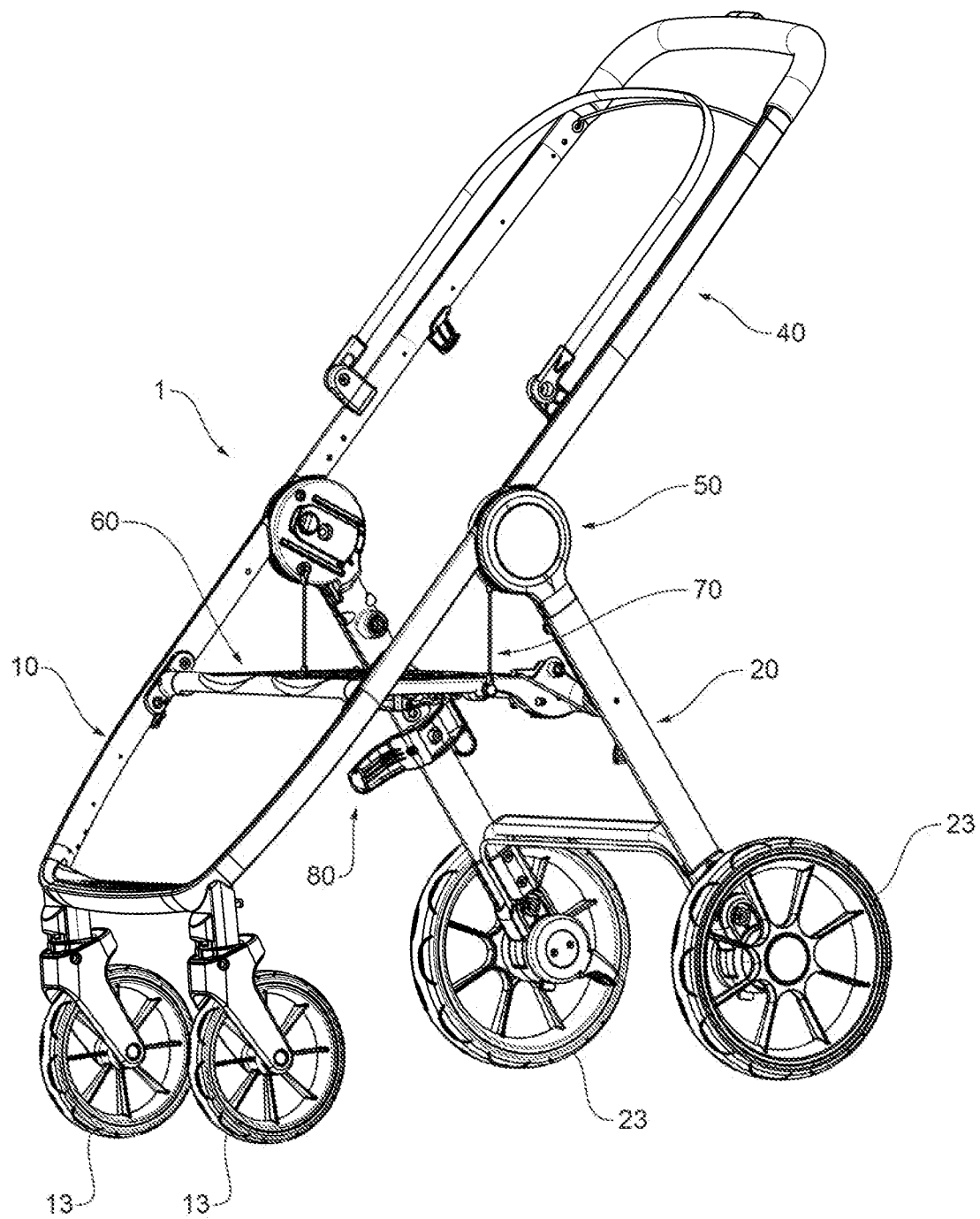
FIG. 1A is a front perspective view of a collapsible stroller frame in an unfolded configuration according to an embodiment.

Referring now to FIGS. 1A to 6 there is shown a collapsible stroller 1, comprising a handle assembly 40, a front leg assembly 10 and a rear leg assembly 20, pivotably connected to one another such that the stroller is able to be moved between a folded (or stowed) configuration, where the front leg and handle assembly are folded to positions substantially adjacent to the rear leg assembly, and an unfolded (or deployed) configuration, where the front leg and handle assemblies 10, 40 are unfolded to positions away from the rear leg assembly 20, and a link assembly 60 comprising a front member 61 and a rear member 64 pivotally connected to one another, wherein the front member 61 is pivotally connected to an intermediate portion of the front leg assembly 10 and the rear member 64 is pivotally connected to an intermediate portion of the rear leg assembly 20, such that when the stroller 1 is able to be moved to its folded configuration the front and rear members 61, 64 are folded toward each other to lie substantially adjacent to one another and the front and rear leg assemblies 10, 20 and when the stroller 1 is moved to its unfolded configuration the front and rear members 61, 64 are folded away from each other and the front and rear leg assemblies 10, 20 such that they are substantially coplanar with one another, and wherein the link assembly 60 further comprises a biasing means for biasing the front and rear members 61, 64 toward their unfolded positions.

Figure 5:
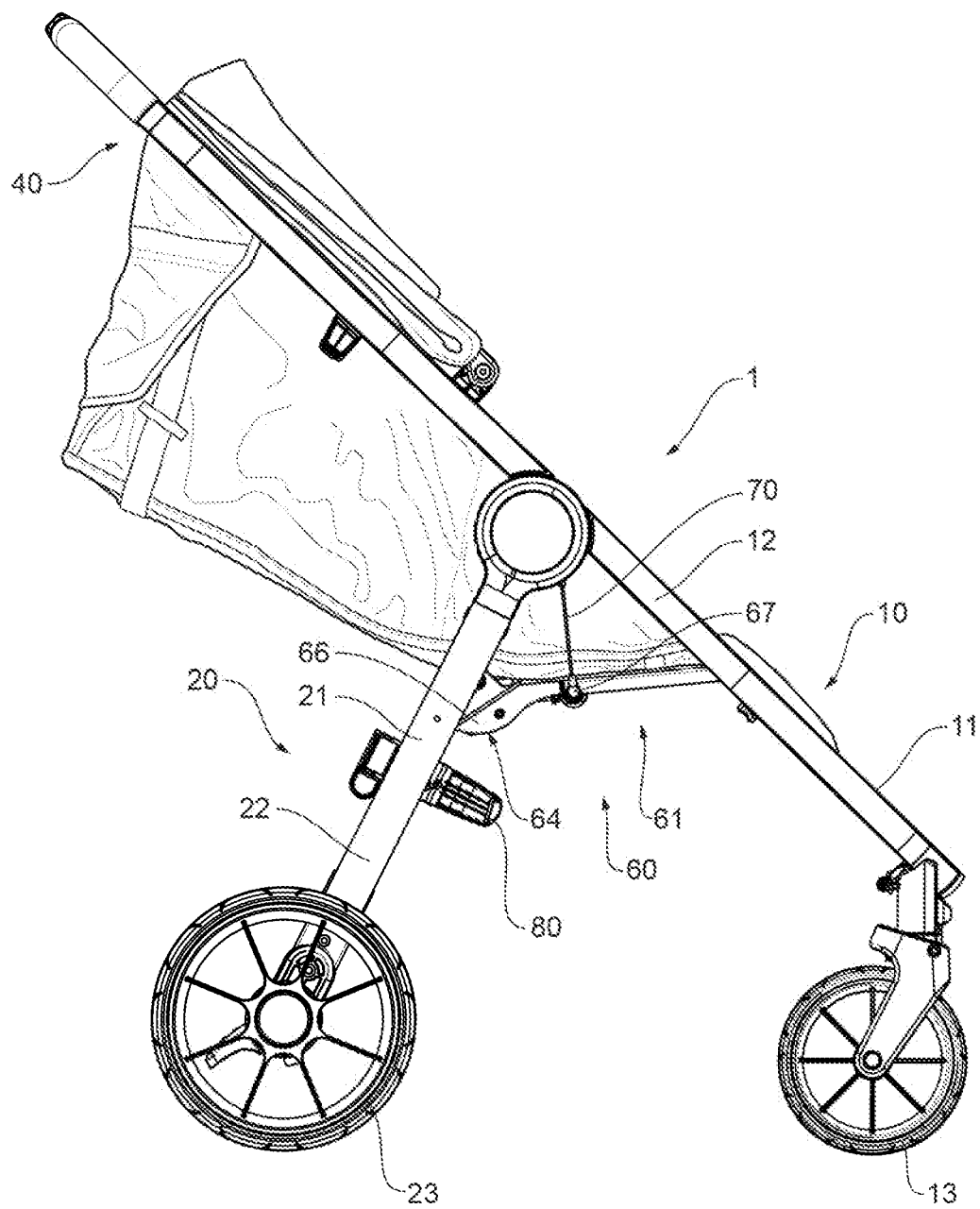
FIG. 5 is a side view of a collapsible stroller in an unfolded configuration.
Figure 6:
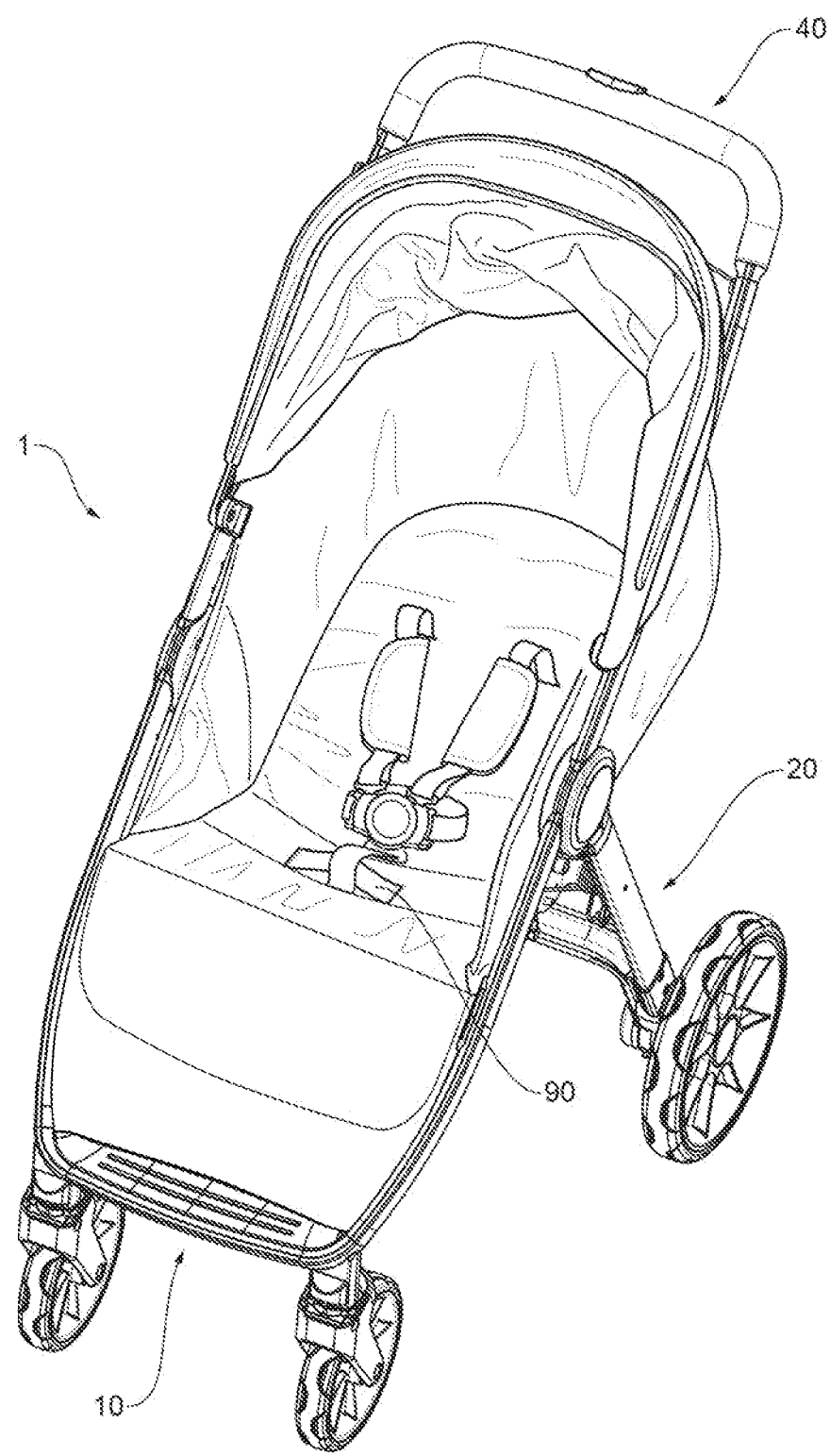
FIG. 6 is a front perspective view of the collapsible stroller of FIG. 5.

In the embodiment shown, the link assembly 60 providing a support surface for a passenger (or occupant) of the stroller 1 to sit on when the stroller 1 is in an unfolded configuration (as best shown in FIGS. 5 and 6).

As best seen in FIGS. 1A to 1D, the front leg assembly 10 is configured to support two front wheels 13. It will be appreciated that in an alternative embodiment, the stroller 1 may instead comprise a single front wheel, as is common in jogger type strollers. The front leg assembly 10 comprises a forward end portion 11 configured to support the front wheels 13, and a rearward end portion comprising two legs 12 which extend away from the forward end portion 11 along either side of the stroller 1.

The rear leg assembly 20 comprises a lower end portion 22 configured to support two rear wheels 23, and an upper end portion comprising two legs 21 which extend away from the lower end portion 22 along either side of the stroller 1.

Figure 1B:
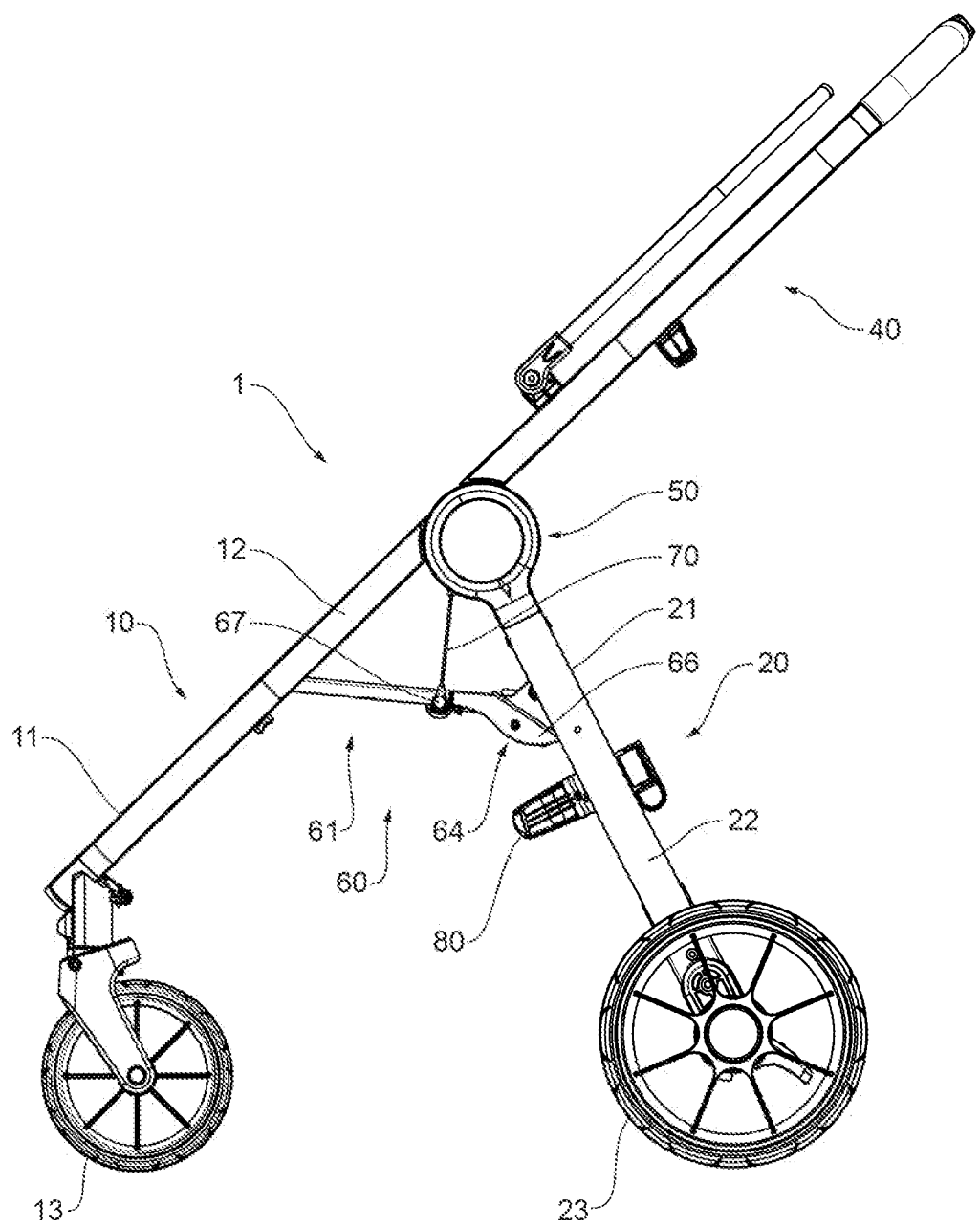
FIG. 1B is a side view of the collapsible stroller frame of FIG. 1A in an unfolded configuration.
Figure 1C:
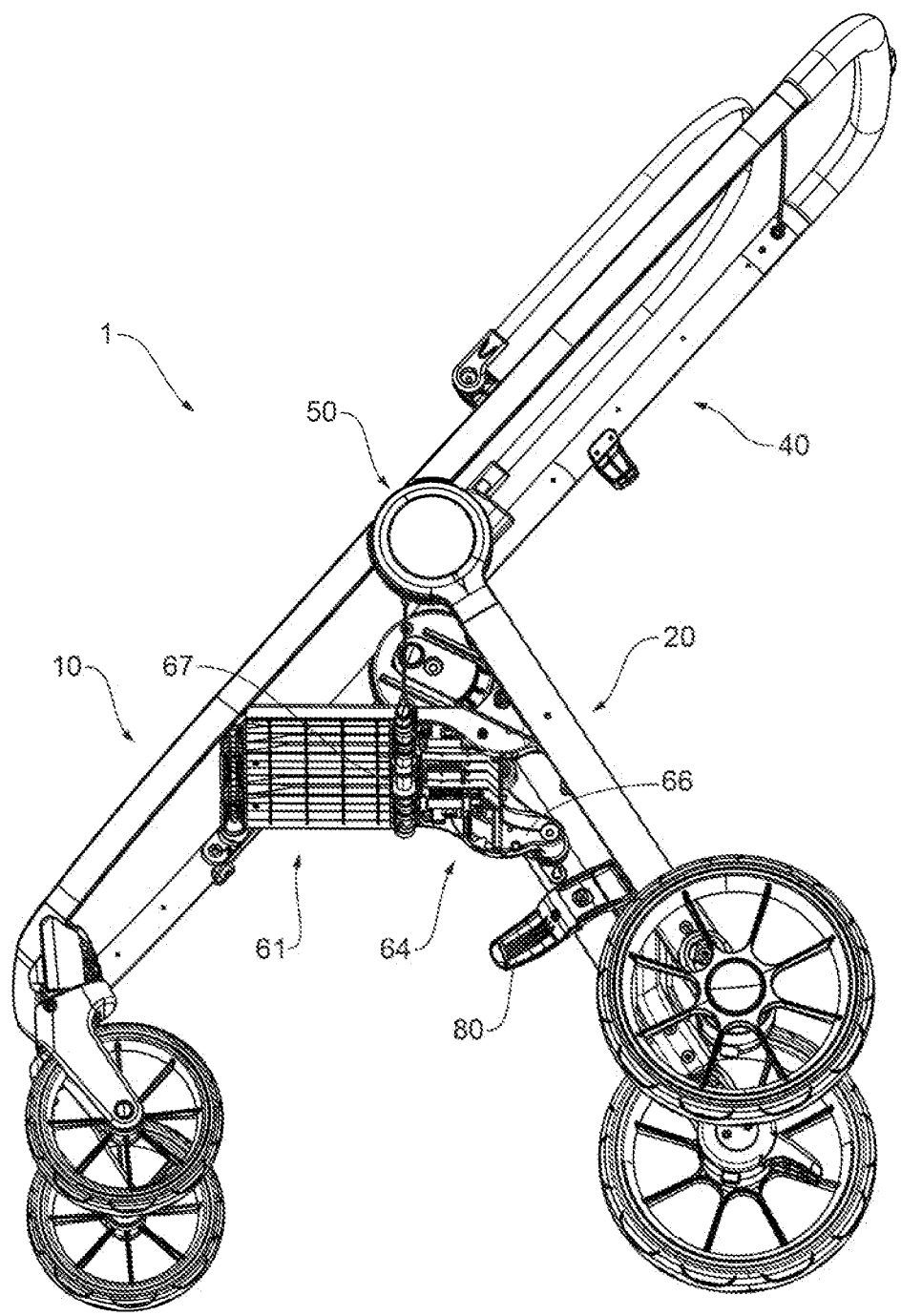
FIG. 1C is a bottom perspective view of the collapsible stroller frame of FIG. 1A in an unfolded configuration.
Figure 1D:
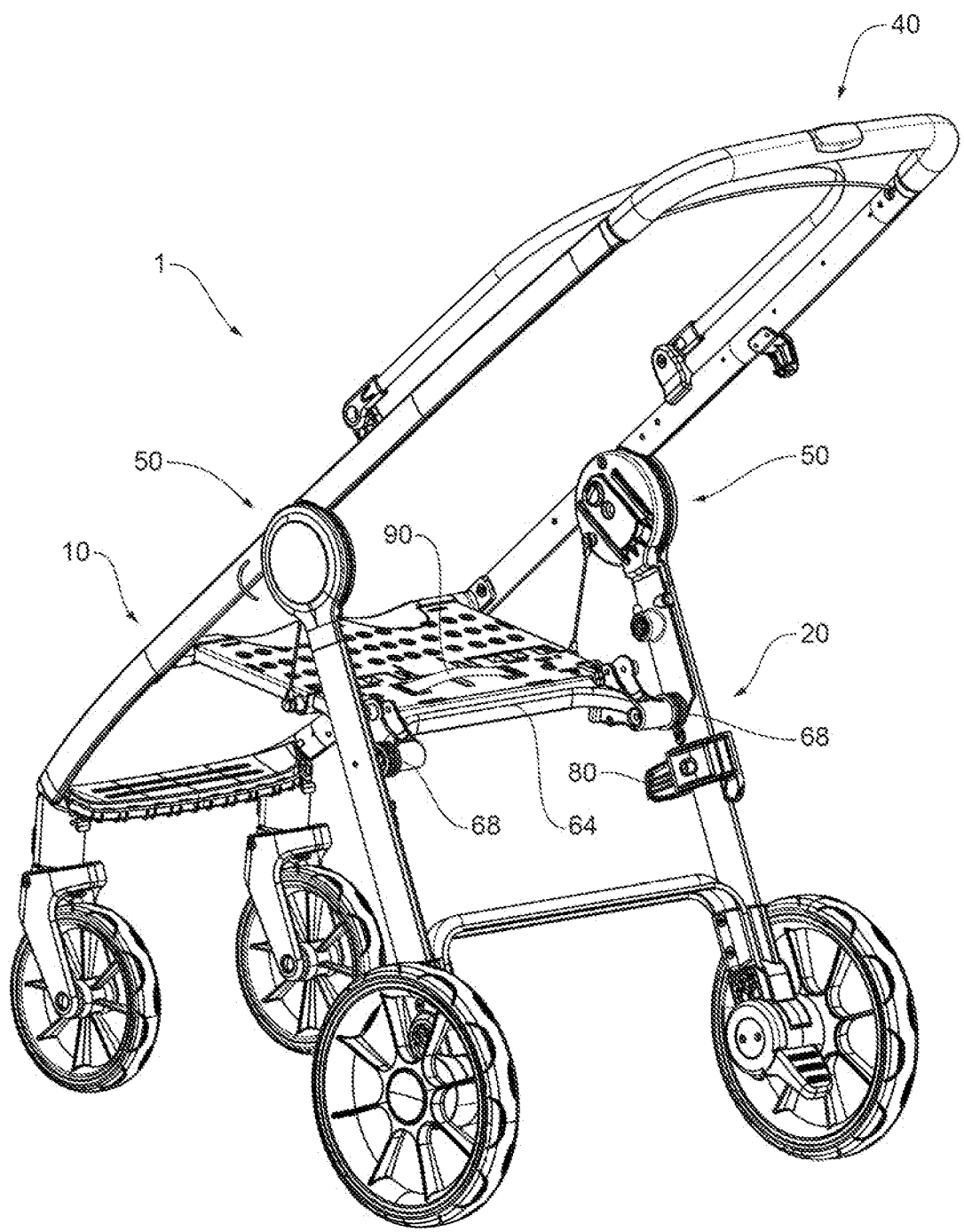
FIG. 1D is a rear perspective view of the collapsible stroller frame of FIG. 1A in an unfolded configuration.
Figure 2A:
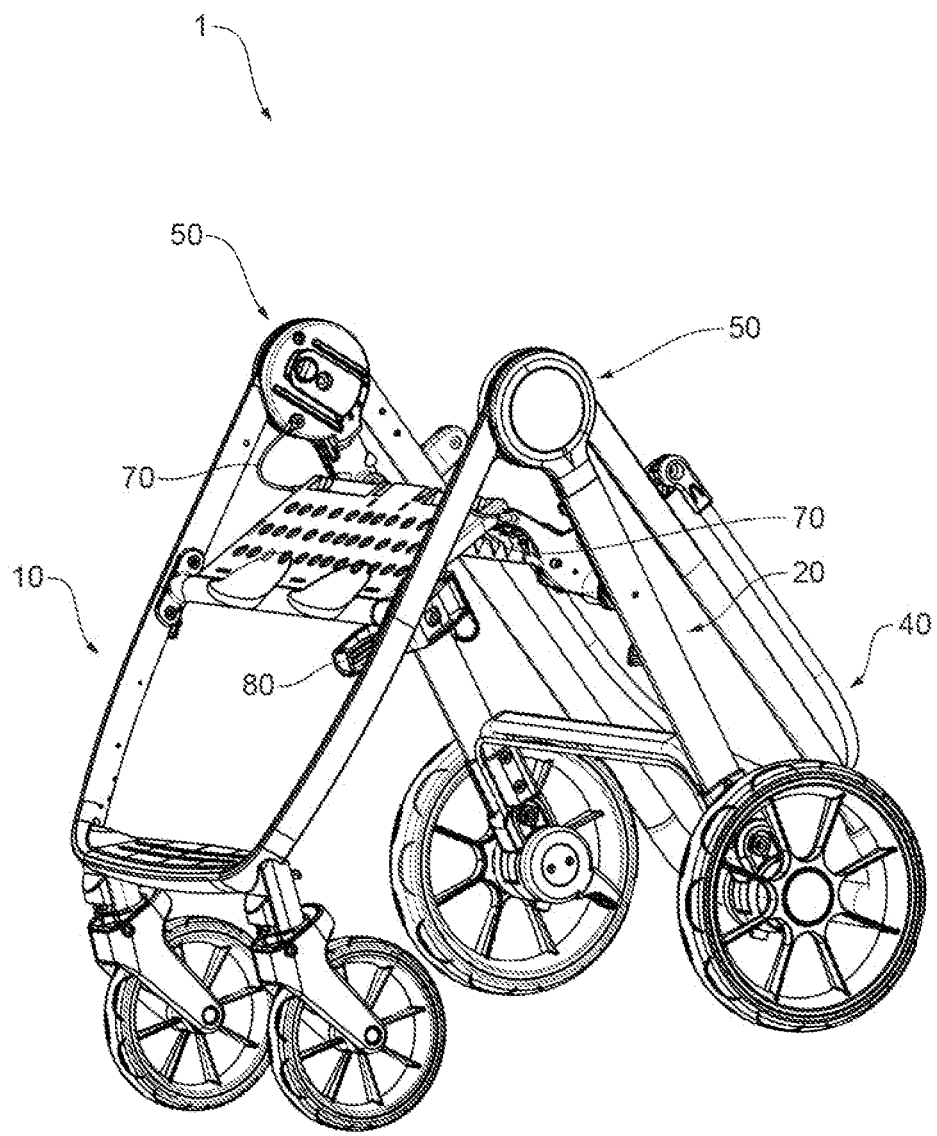
FIG. 2A is a front perspective view of the collapsible stroller frame of FIG. 1A in a partially folded configuration.
Figure 2B:
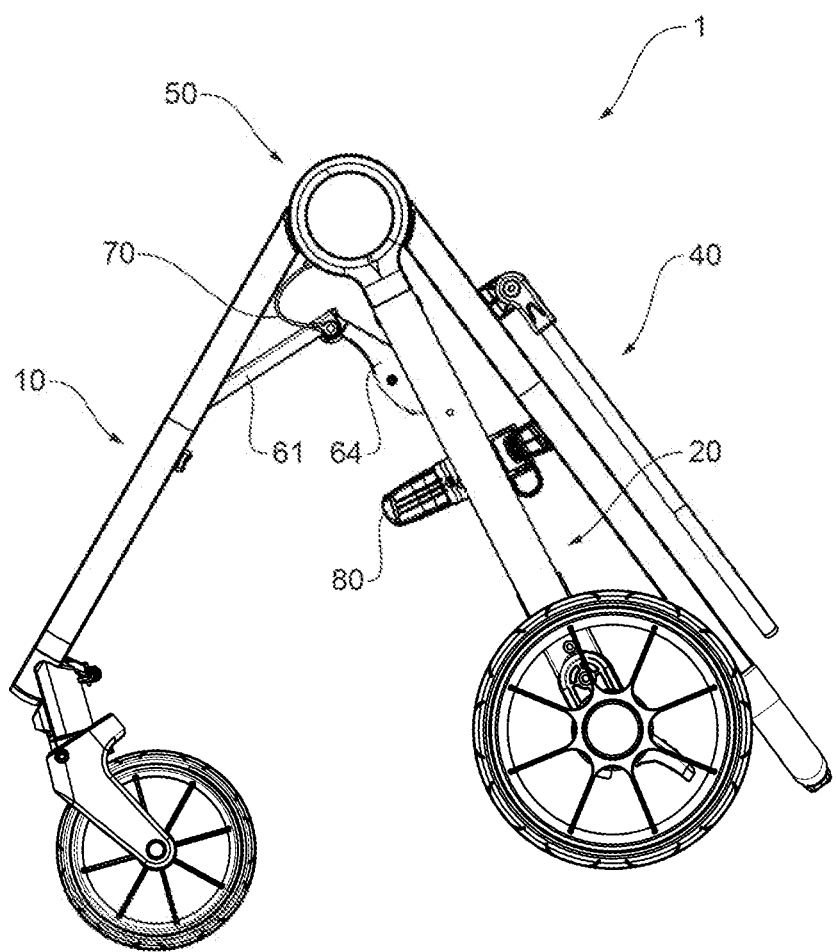
FIG. 2B is a side view of the collapsible stroller frame of FIG. 1A in a partially folded configuration.
Figure 2C:
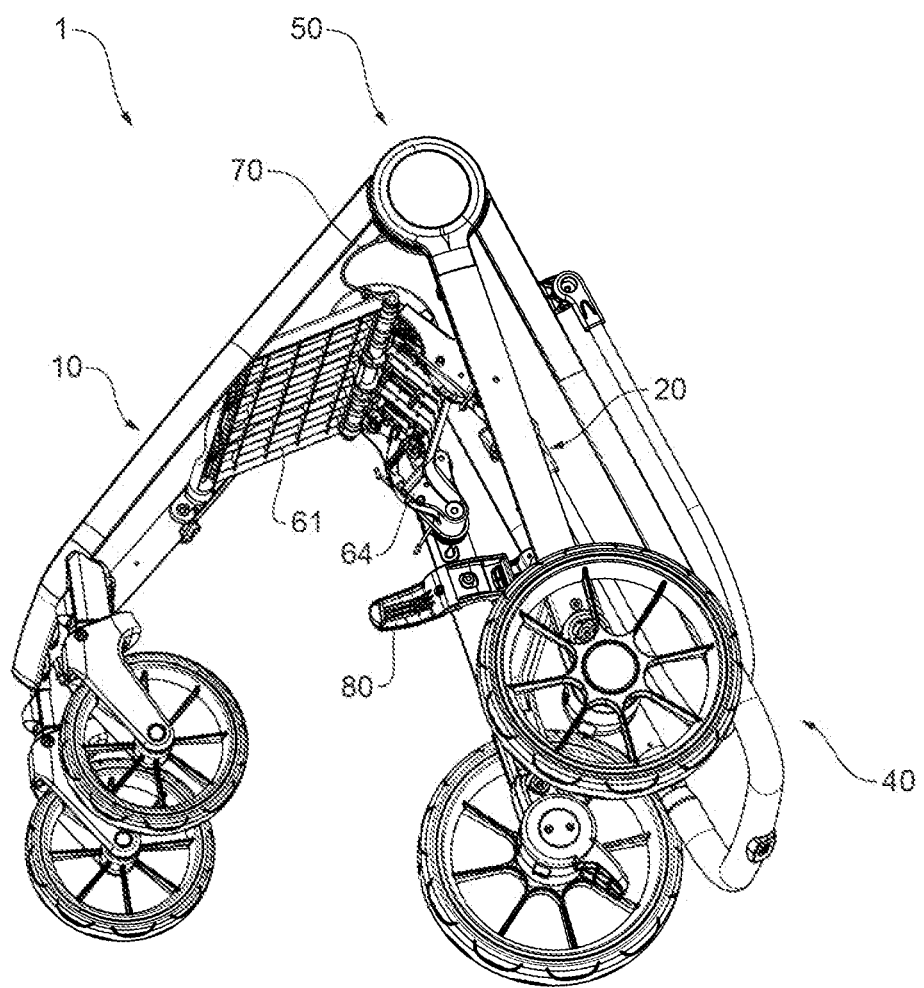
FIG. 2C is a bottom perspective view of the collapsible stroller frame of FIG. 1A in a partially folded configuration.
Figure 2D:
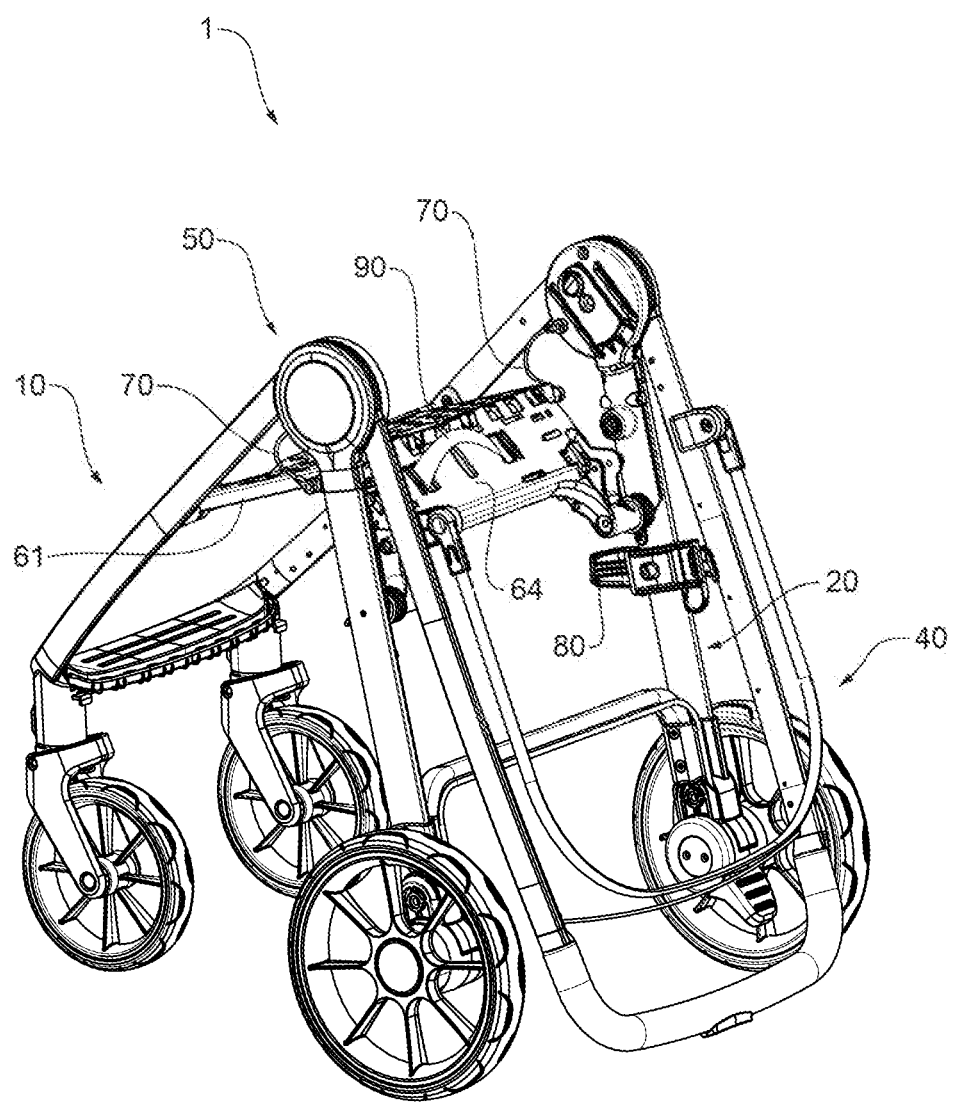
FIG. 2D is a rear perspective view of the collapsible stroller frame of FIG. 1A in a partially folded configuration.
Figure 4:
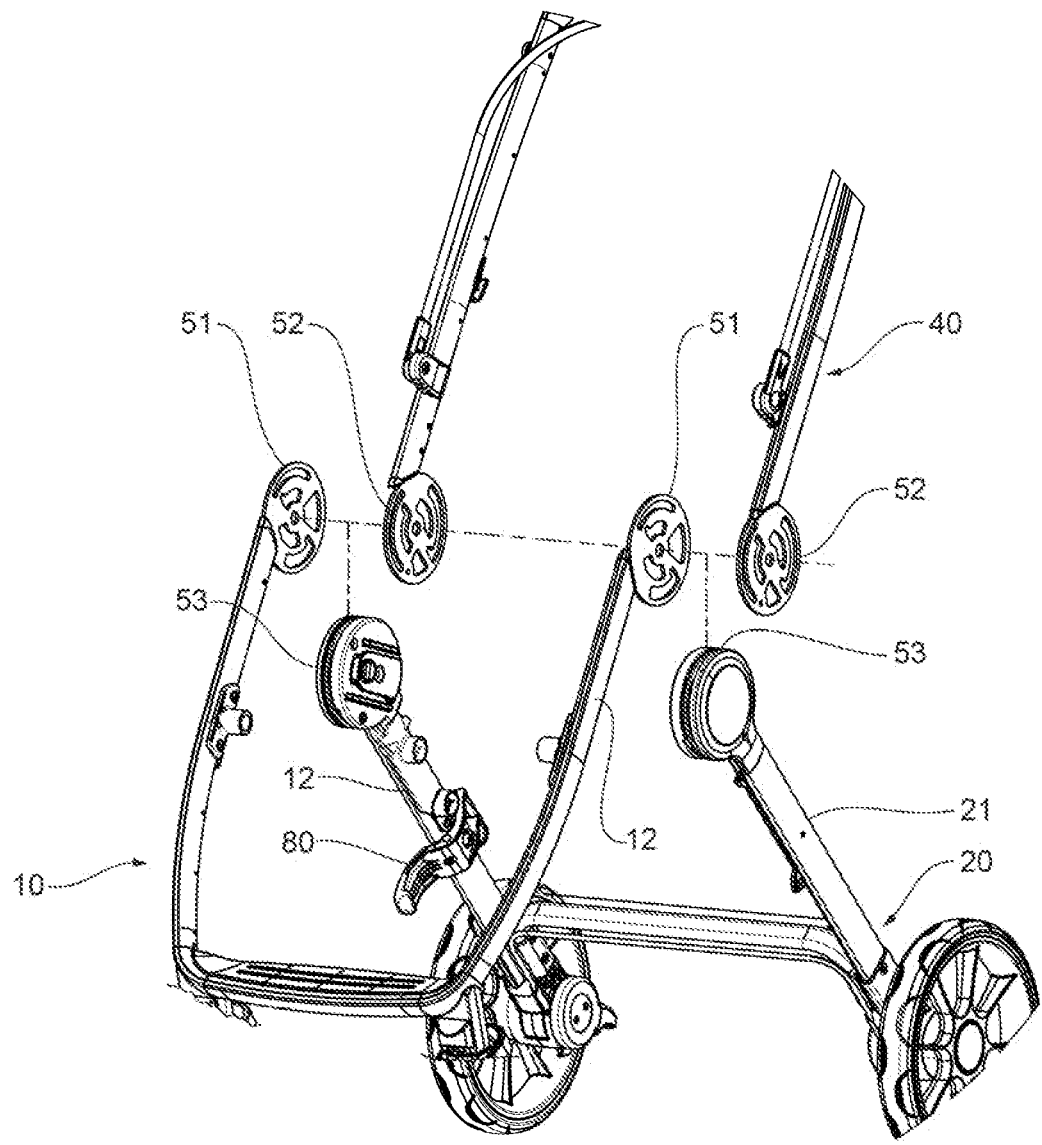
FIG. 4 is an exploded perspective view of a portion of the collapsible stroller frame of FIG. 1A with the link assembly removed.

As best seen in FIGS. 1A and 1D, the rearward end portion legs 12 of the front leg assembly 10 and the upper end portion legs 21 of the rear leg assembly 20 are pivotally connected to one another by a folding assembly 50. For the purposes of this description, a single folding assembly will be described. As best shown in FIG. 4, each folding assembly 50 comprises a first rotatable member 51 rotatably coupled to a pivot member 53 supported by an upper end portion leg 21 of the rear leg assembly 20, a rearward end portion 12 of the front leg assembly 10 being attached to the first rotatable member 51 such that the front leg assembly 10 is pivotably rotatable with respect to the rear leg assembly 20.

The handle assembly 40 comprises a handle portion having two side arms extending away from the handle portion along either side of the stroller. The handle assembly is also connected and pivotable with respect to the rear wheel support 20 by virtue of the folding assembly 50. The folding assembly 50 also comprising a second rotatable member 52 attached to the handle assembly 40 and rotatably coupled to the pivot member 53.

Figure 3A:
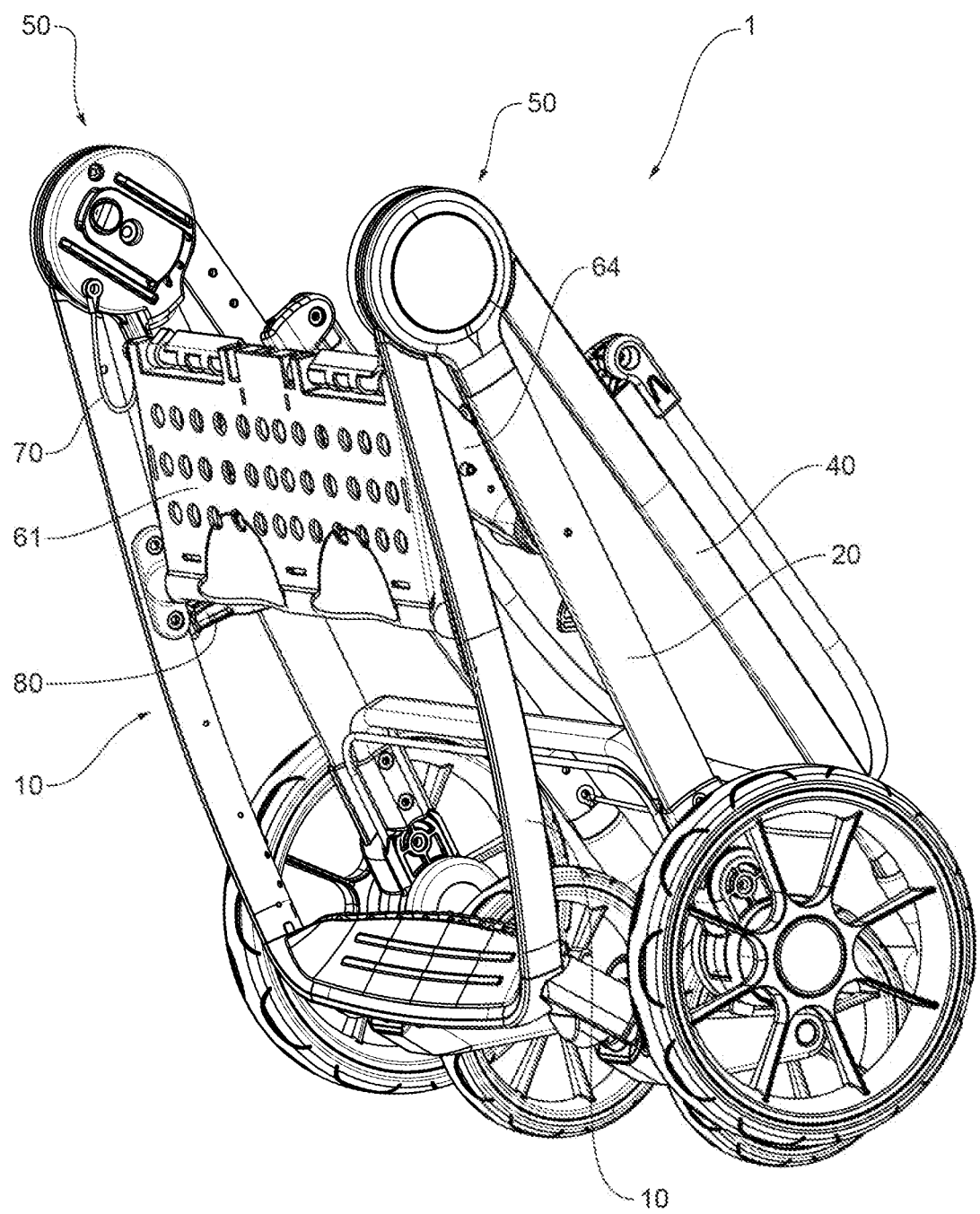
FIG. 3A is a front perspective view of the collapsible stroller frame of FIG. 1A in a folded configuration.
Figure 3B:
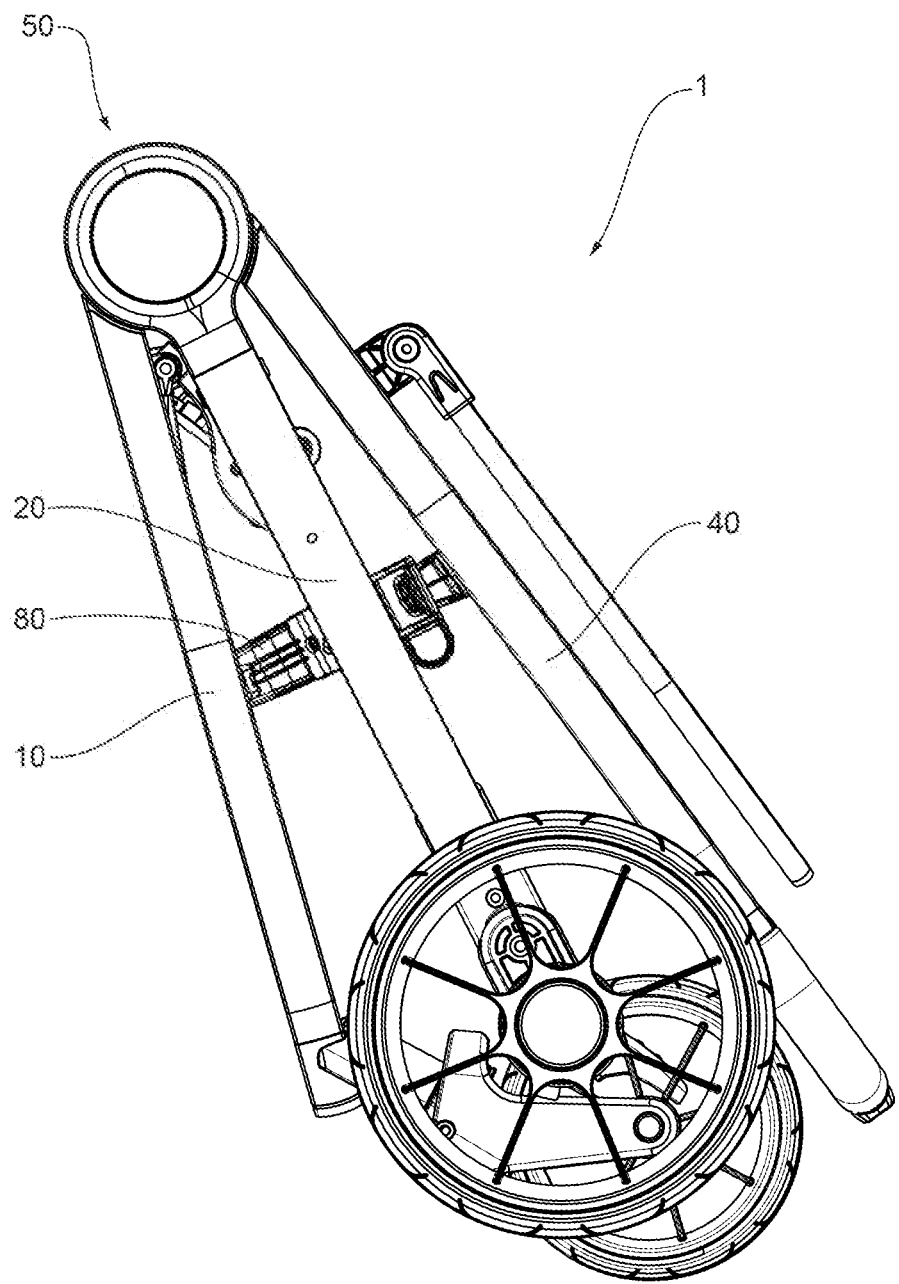
FIG. 3B is a side view of the collapsible stroller frame of FIG. 1A in a folded configuration.
Figure 3C:
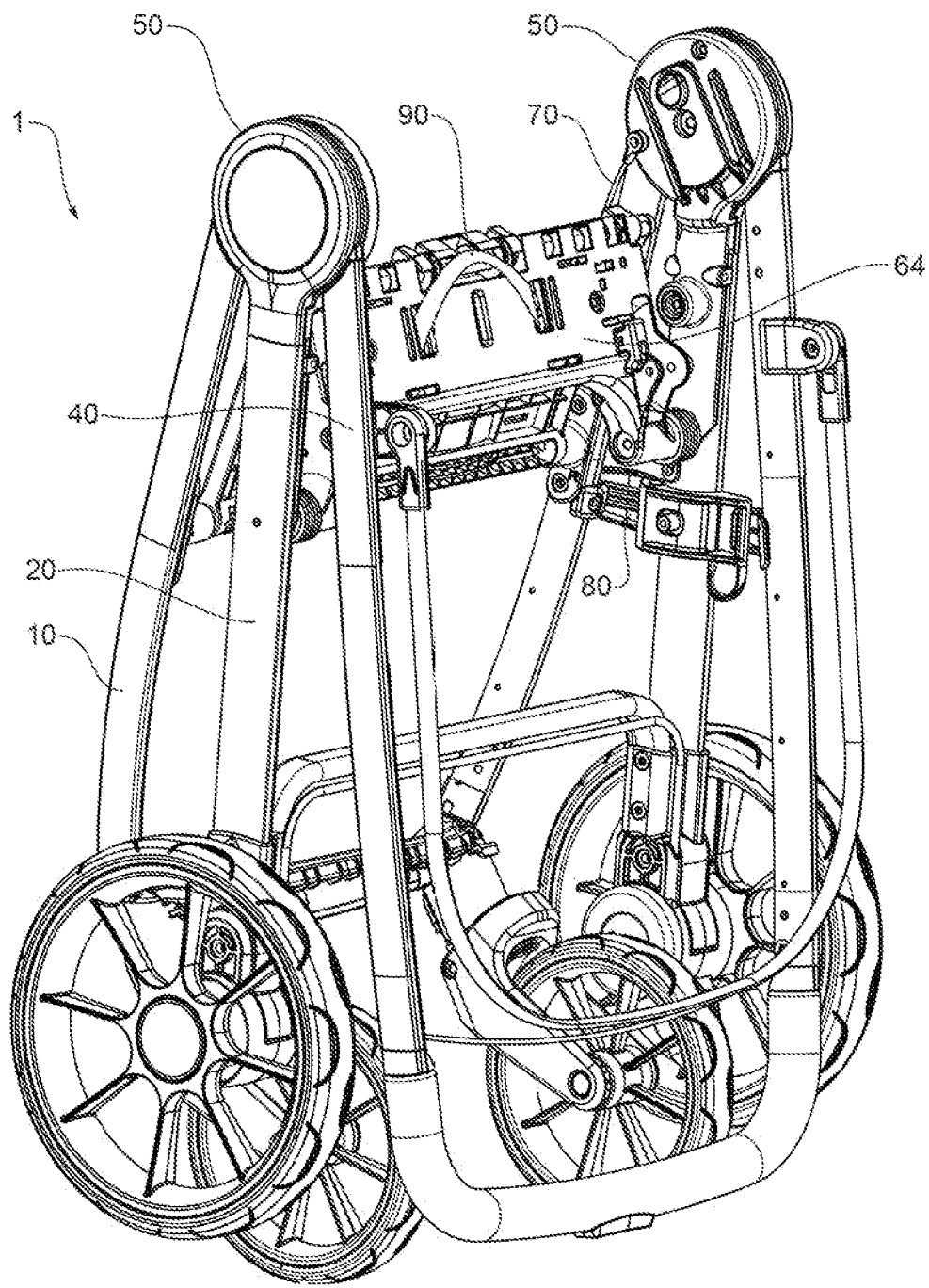
FIG. 3C is a rear perspective view of the collapsible stroller frame of FIG. 1A in a folded configuration.

The first and second rotatable members 51, 52 are configured to rotate independently of one another, such that the front leg assembly 10 and handle assembly 40 independently fold in relation to the rear leg assembly 20. It will be appreciated that by virtue of the rotatable relationship between the rotatable members 51, 52 and the pivot member 53, the stroller 1 is able to be moved between its folded (or stowed) configuration (as shown in FIGS. 3A to 3C) and unfolded (or deployed) configuration (as shown in FIGS. 1A to 1C). It can also be seen that the link assembly 60 connected to the front and the rear leg assemblies 10, 20 also moves such that the front rear members 61, 64 fold toward one another as the stroller 1 moves from its unfolded configuration to its folded configuration.

As shown in FIG. 1D, the means for biasing the link assembly 60 toward its unfolded position is in the form of a torsion spring 68 in connection with the rear leg assembly 20 and the rearward end portion 66 of the rear member 64 of the link assembly 60. It will be appreciated that the torsion spring 68 acts on the rear member 64 to urge the link assembly 60 toward its deployed position.

In alternate embodiments, the means for biasing the link assembly 60 toward the unfolded position may take other forms, such as a torsion spring acting on the front member 61 of the link assembly 60 or a torsion spring positioned about the hinge pin 67 at the pivotal link between the front member 61 and the rear member 64.

It will be appreciated that the biasing means urging the link assembly 60 toward its unfolded configuration acts as an assisting force when a user is unfolding the stroller 1. It will further be appreciated that the biasing means also acts to maintain the stroller 1 in its unfolded configuration.

The stroller 1 also comprises a tether member 70 in the form of a flexible cable, where one end of the tether member 70 is in connection with the stroller frame via the pivot member 53 and the other end of the tether member 70 is in connection with the hinge pin 67 of the link assembly 60. It will be appreciated that when the stroller 1 is in the unfolded position, the tether member 70 acts as a tensile member, preventing over rotation of the link assembly 60 (maintaining a flat seating surface with the front member and rear member 61, 64 substantially coplanar, and transferring the weight of the occupant on the seat (formed by the link assembly 60) to the stroller frame via the pivot member 53. As can be seen in FIGS. 2A to 3C, when the stroller is moved to a folded configuration, the tether member 70, by virtue of its flexibility, is able to flexibly deform as the link assembly 60 and the front and rear leg assemblies 10, 20 fold together, preventing, or at least reducing, the risk of pinch points. It will be appreciated that in alternative embodiments, the tether member may be in the form of a hinged member extending between the stroller frame and the link assembly 60.

A description of the process of folding and unfolding of the stroller will now be provided.

Folding Procedure

Starting in the deployed (or unfolded) configuration as shown in FIGS. 1A to 1D, the folding assembly 50 is unlocked by first actuating a first release means in the form of a release button (not shown) and then actuating a second release means in the form of a centre-pull strap 90 extending from the rear member 64 of the link assembly 60. Actuation of the centre-pull strap 90 is performed by lifting the strap up. This two-step unlocking procedure and use of a centre-pull strap is known in the art and is necessary to satisfy local safety standards. It will be appreciated that alternative unlocking procedures may also be possible.

Upon actuating the centre-pull strap 90, the second rotatable member 52 is unlocked and allowed to rotate with respect to the pivot member 53, resulting in the handle assembly 40 collapsing due to self-weight and rotating about the pivot member 53 until it is locked against the rear leg assembly 20 by a locking means in the form of a frame lock 80 as shown in FIGS. 2A to 2D.

As also shown in FIGS. 2A to 2D, as the centre-pull strap 90 is lifted further, the link assembly 60 begins to fold, with the strap applying a lifting force to the rear member 64 adjacent the hinge pin 67, which in turn assists in pulling the front leg assembly 10 inwardly. It will be appreciated, that once the initial movement is started, and the centre-pull strap 90 is lifted further still, self-weight will cause the front leg assembly 10 to fold toward and become locked against the rear leg assembly 20 by the frame lock 80 in the folded (or collapsed) configuration as shown in FIGS. 3A to 3C. It will be appreciated that the folding of the link assembly 60 causes the torsion spring 68 to become loaded to assist in the unfolding procedure described below.

Unfolding Procedure

Starting in the folded position as shown in FIGS. 3A to 3C, the frame lock 80 is actuated causing the handle assembly 40 to be released from the rear leg assembly 20, where it is unfolded to its unfolded position (as shown in FIGS. 1A to 1D). Actuation of the frame lock 80 also causes the front leg assembly 10 to be released from the rear leg assembly 20, where by virtue of the spring force applied by the torsion spring 68 on the rear member 64 of the link assembly 60, the front leg assembly 10 unfolds to its deployed position (as shown in FIGS. 1A to 1D).

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A collapsible stroller comprising:
   a handle assembly, a front leg assembly and a rear leg assembly pivotably connected to one another such that the stroller is able to be moved between a folded configuration, where the front leg and handle assemblies are folded to positions substantially adjacent to the rear leg assembly, and an unfolded configuration, where the front leg and handle assemblies are unfolded to positions away from the rear leg assembly;
   a link assembly comprising a front member and a rear member pivotally connected to one another, wherein the front member is pivotally connected to an intermediate portion of the front leg assembly and the rear member is pivotally connected to an intermediate portion of the rear leg assembly, such that when the stroller is moved to its folded configuration the front and rear members are folded toward each other to lie substantially adjacent to one another and the front and rear leg assemblies, and when the stroller is moved to its unfolded configuration the front and rear members are folded away from each other and the front and rear leg assemblies such that they are substantially coplanar with one another, wherein the front leg assembly pivots independently of the handle assembly; and
   a locking member configured to lock the front leg and handle assemblies relative to the rear leg assembly when the stroller is in its folded configuration.

2. The collapsible stroller of claim 1, wherein the locking member is located on the rear leg assembly.

3. The collapsible stroller of claim 1, wherein the collapsible stroller has a left side opposite a right side, and wherein the front member extends from the left side to the right side.

4. The collapsible stroller of claim 1, wherein the collapsible stroller has a left side opposite a right side, and wherein the rear member extends from the left side to the right side.

5. The collapsible stroller of claim 1, wherein the front leg and handle assemblies are pivotable relative to the rear leg assembly about the same axis.

6. The collapsible stroller of claim 1, wherein the locking member is a first locking member, the collapsible stroller further comprising a second locking member configured to lock the front leg and handle assemblies relative to the rear leg assembly when the stroller is in its unfolded configuration.

7. The collapsible stroller of claim 6, further comprising a first actuator and a second actuator, the collapsible stroller configured such that actuating both the first and second actuators unlocks the second locking member when the stroller is in its unfolded configuration thereby releasing the locked front leg and handle assemblies.

8. The collapsible stroller of claim 7, wherein the first actuator is a button.

9. The collapsible stroller of claim 7, wherein the second actuator is a strap disposed on the link assembly.

10. The collapsible stroller of claim 9, wherein the strap is disposed on the rear member of the link assembly.

11. The collapsible stroller of claim 9, further comprising two rear wheels connected to the rear leg assembly and at least one front wheel connected to the front leg assembly, the collapsible stroller configured such that the strap is actuated by pulling the strap away from the two rear wheels and at least one front wheel.

12. The collapsible stroller of claim 1, further comprising a flexible cable, wherein a first end of the flexible cable is connected to the rear leg assembly and a second end of the flexible cable is connected to the link assembly.

13. The collapsible stroller of claim 1, wherein the front leg assembly includes a forward end portion configured to support at least one front wheel, and a rearward end portion including two legs that extend away from the forward end portion along either side of the stroller.

14. The collapsible stroller of claim 1, wherein the rear leg assembly includes a lower end portion configured to support at least one rear wheel, and an upper portion including two legs that extend away from the lower end portion along either side of the stroller.

15. The collapsible stroller of claim 1, wherein the handle assembly includes a handle portion and two side arms extending away from the handle portion along either side of the stroller.

16. A method of adjusting a collapsible stroller including a handle assembly, a front leg assembly and a rear leg assembly pivotably connected to one another such that the stroller is able to be moved between a folded configuration, where the front leg and handle assemblies are substantially adjacent to the rear leg assembly, and an unfolded configuration, where the front leg and handle assemblies are positioned away from the rear leg assembly, the collapsible stroller further including a link assembly comprising a front member and a rear member pivotally connected to one another, wherein the front member is pivotally connected to an intermediate portion of the front leg assembly and the rear member is pivotally connected to an intermediate portion of the rear leg assembly, such that when the stroller is in its folded configuration the front and rear members lie substantially adjacent to one another and the front and rear leg assemblies, and when the stroller is in its unfolded configuration the front and rear members are substantially coplanar with one another, the method comprising:
  actuating a first actuator of the collapsible stroller with the collapsible stroller in its unfolded configuration;
  actuating a second actuator of the collapsible stroller with the collapsible stroller in its unfolded configuration by pulling the second actuator, thereby causing the handle assembly to pivot towards the rear leg assembly until the handle assembly is locked to a locking member disposed on the rear leg assembly; and
  pulling the second actuator, subsequent to actuating the second actuator, thereby causing: (i) the front member to pivot relative to the rear member and (ii) the front leg assembly to pivot towards the rear leg assembly until the front leg assembly is locked to the locking member disposed on the rear leg assembly.

17. The method of claim 16, wherein the handle assembly pivots towards the rear leg assembly as a result of gravitational force alone, upon actuating the first and second actuators.

18. The method of claim 17, further comprising actuating a third actuator of the locking member to thereby release the locked handle and front leg assemblies from the locking member.

19. The method of claim 18, further comprising pivoting the released handle assembly away from the rear leg assembly and pivoting the released front leg assembly away from the rear leg assembly.

* * * * *